United States Patent
Dollar, II et al.

(10) Patent No.: US 6,310,753 B1
(45) Date of Patent: Oct. 30, 2001

(54) LOW IMPEDANCE MAGNETIC LATCH TRIPPING SCHEME

(75) Inventors: Charles Randall Dollar, II, Norcross; Mario Bilac, Lawrenceville, both of GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/434,569

(22) Filed: Nov. 5, 1999

(51) Int. Cl.$^7$ ........................................ H02H 3/00
(52) U.S. Cl. ........................................ 361/93.2; 361/102
(58) Field of Search ..................... 361/93.1–93.9, 361/100, 102, 152, 156, 160, 170, 187, 42; 702/58, 64; 335/6, 8, 10, 13, 18, 21

(56) References Cited

U.S. PATENT DOCUMENTS

| | | | |
|---|---|---|---|
| 4,316,230 | * 2/1982 | Hansen et al. | 361/114 |
| 4,589,052 | * 5/1986 | Dougherty | 361/94 |
| 5,105,326 | * 4/1992 | Shimp et al. | 361/49 |
| 5,151,842 | * 9/1992 | DeBiasi et al. | 361/93 |
| 5,202,662 | * 4/1993 | Bienwald et al. | 335/18 |
| 5,224,006 | * 6/1993 | MacKenzie et al. | 361/45 |
| 5,428,495 | * 6/1995 | Murphy et al. | 361/85 |
| 5,517,165 | * 5/1996 | Cook | 335/18 |
| 5,691,869 | * 11/1997 | Engel et al. | 361/42 |
| 5,691,871 | * 11/1997 | Innes | 361/96 |
| 5,745,114 | 4/1998 | King et al. | 345/352 |
| 5,774,319 | * 6/1998 | Carter et al. | 361/93 |
| 5,905,616 | 5/1999 | Lyke | 361/64 |
| 5,920,451 | * 7/1999 | Fasano et al. | 361/45 |
| 5,936,817 | 8/1999 | Matsko et al. | 361/72 |
| 5,963,405 | * 10/1999 | Engel et al. | 361/42 |

* cited by examiner

*Primary Examiner*—Michael J. Sherry
(74) *Attorney, Agent, or Firm*—Foley & Lardner

(57) ABSTRACT

A circuit breaker system (100) providing a low impedance magnetic latch tripping scheme. The circuit breaker system (100) includes a trip unit (310) coupled to a switch unit (108). Trip unit (310) is coupled to an electrical circuitry and utilizes a current transformer (114) to sample a current conducting through the electrical circuitry. This current is processed into an input signal (126) suitable as an input to a trip circuitry (316) included in the trip unit (310). When a processor (322) senses an overcurrent condition in the input signal (126), processor (322) transmits a trip signal (128) to a switch (220) to initiate protection against the overcurrent condition, i.e., a trip of the electrical circuitry. Switch (220) permits a low release current to conduct through a low impedance electromechanical interface unit (218) such that the electromechanical interface unit (218) can actuate a mechanical opening mechanism included in the switch unit (108).

32 Claims, 7 Drawing Sheets

LOW IMPEDANCE MAGNETIC LATCH TRIPPING SCHEME

BACKGROUND OF THE INVENTION

The present invention relates generally to circuit breaker systems. More particularly, the present invention relates to a circuit breaker system equipped to provide overcurrent protection via a magnetic latch.

Circuit breakers are used to protect electrical circuitry from damage due to an overcurrent condition, such as an overload, a relatively high level short circuit, or a ground fault condition. To perform this function, circuit breakers presently include a switch unit and a trip unit. The switch unit is coupled to the electrical circuitry (i.e., lines and loads) such that it can open or close the electrical path of this electrical circuitry. The switch unit includes a pair of separable contacts per phase, a pivoting contact arm per phase, an operating mechanism, and an operating handle.

For each phase, a first contact of the pair of separable contacts is supported and moveable by the pivoting contact arm and a second contact is substantially stationary. All of the pivoting contact arms are coupled to the operating mechanism, and the operating mechanism is coupled to the operating handle. The operating handle is substantially disposed on the outside of the switch unit. In this manner, the operating mechanism can simultaneously actuate the pivoting contact arms, thereby either engaging or disengaging the pairs of separable contacts, in response to manual manipulation of the operating handle (i.e., a switch). Thus, in the overcurrent condition, all the pairs of separable contacts are disengaged or tripped (i.e., opening the electrical circuitry), and when the overcurrent condition is no longer present, the circuit breaker can be reset such that all the pairs of separable contacts are engaged (i.e., closing the electrical circuitry).

In addition to manual overcurrent protection via the operating handle, automatic overcurrent protection is also provided via the trip unit. The trip unit, coupled to the switch unit, senses the electrical circuitry for the overcurrent condition and automatically trips the circuit breaker. When the overcurrent condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

There are two types of trip units: a thermal-magnetic trip unit and an electronic trip unit. The thermal-magnetic trip unit is a mechanical system that utilizes thermal or magnetic field changes in one or more components within the trip unit to sense the overcurrent condition. The electronic trip unit is an electronic system that includes, among others, circuitry, current transformers, an electromechanical interface unit, and solid-state devices to sense the overcurrent condition. Presently, the electromechanical interface unit in the electronic trip unit requires dedicated components and/or circuitry to provide a relatively high current to actuate the electromechanical interface unit or to selectively isolate the electromechanical interface unit from other parts of the electronic trip unit.

Thus, there is a need for a circuit breaker capable of providing reliable electronic tripping. Further, there is a need for an electronic trip unit capable of providing a relatively low current actuation of an electromechanical interface unit included therein using a minimum of dedicated components and/or circuitry.

BRIEF SUMMARY OF THE INVENTION

One embodiment of the invention relates to a system for sensing and protecting against an overcurrent condition in an electrical circuitry. The system includes a processor configured to sense the overcurrent condition in an input signal of the electrical circuitry. The system further includes an electromechanical interface unit coupled to the processor. The electromechanical interface unit is configured to initiate an opening of the electrical circuitry via a low release current, in response to a trip signal from the processor.

Another embodiment of the invention relates to a method for sensing and protecting against an overcurrent condition in an electrical circuitry. The method includes sensing the overcurrent condition with a processor. The method further includes actuating a trip in the electrical circuitry via a low release current, in response to a trip signal from the processor.

Still another embodiment of the invention relates to a system for sensing and protecting against an overcurrent condition in an electrical circuitry. The system includes means for sensing the overcurrent condition and communicating a trip signal in response to the overcurrent condition. The system further includes means for initiating opening of the electrical circuitry in response to the trip signal. The means for initiating responses via a low release current, and the means for initiating is coupled to the means for sensing.

BRIEF DESCRIPTION OF THE DRAWINGS

The preferred embodiment will become more fully understood from the following detailed description, taken in conjunction with the accompanying drawings, wherein like reference numerals denote like elements, in which.

DETAILED DESCRIPTION OF THE INVENTION

Figure 1:
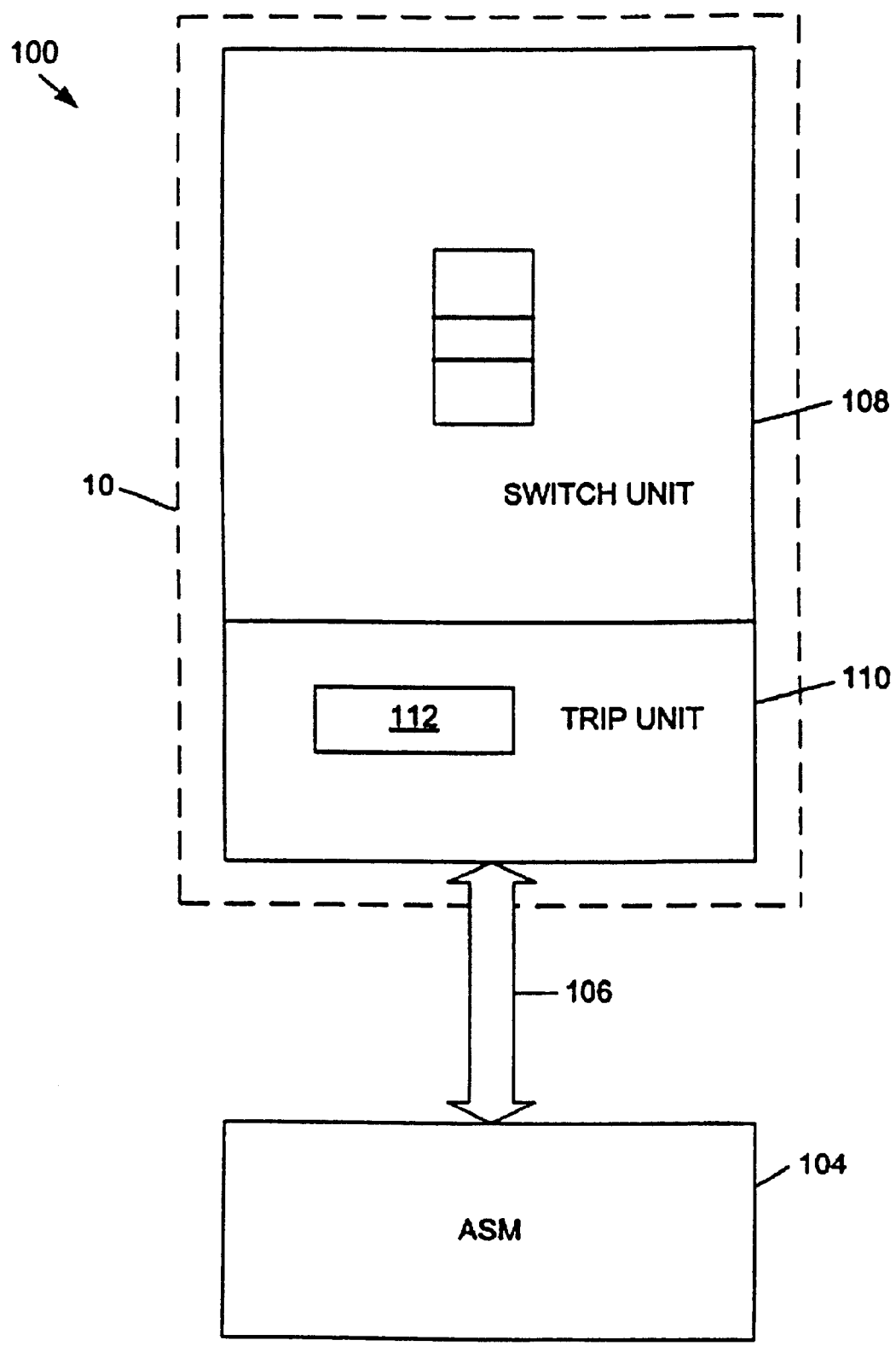
FIG. 1 is a block diagram of a circuit breaker system which employs an embodiment of the present invention.

Referring to FIG. 1, there is shown the major components of a circuit breaker system 100. System 100 includes a circuit breaker 10, an application specific module (ASM) 104, and a communication link 106. System 100 is configured to protect an electrical circuitry (not shown) connected thereto from overcurrent conditions, such as an overload, a short circuit, or a ground fault. System 100 is further configured to acquire, process, control, and communicate information or data relating to overcurrent trip conditions to other devices or to an operator.

Circuit breaker 10 includes a switch unit 108 proximate a trip unit 110. Trip unit 110 is preferably an electronic trip unit (ETU), and is more preferably a liquid crystal display (LCD) electronic trip unit (ETU), and includes a display unit 112, such as a LCD. Circuit breaker 10, and more preferably trip unit 110, communicates with ASM 104 via the communication link 106. Although not shown, system 100 can be coupled to a computer user interface, via a communication adapter, to provide further programmability, interrogation, and monitoring of system 100 and subcomponents therein such as ASM 104.

Figure 2:
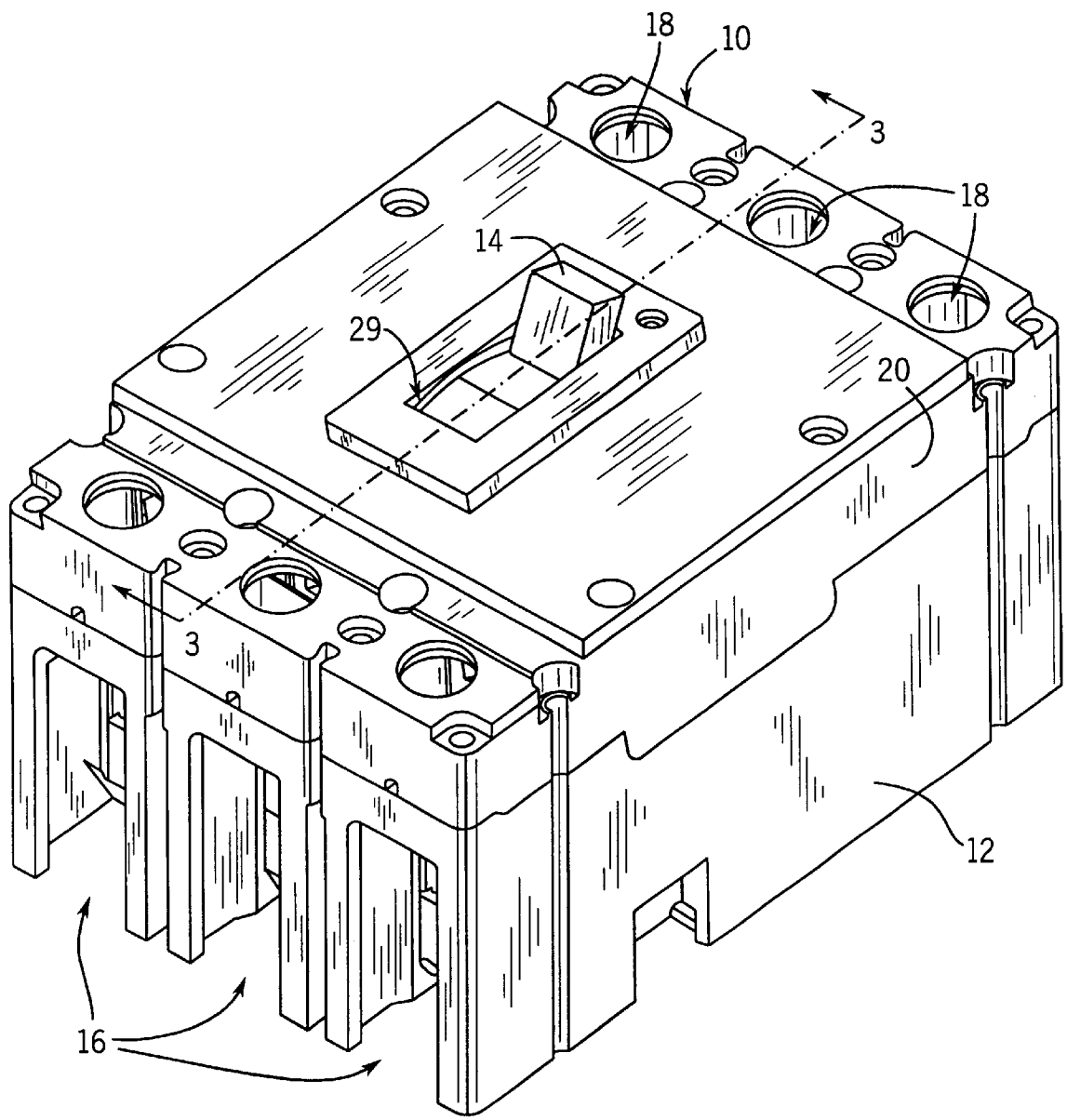
FIG. 2 is an isometric drawing of a circuit breaker which comprises a portion of the circuit breaker system of FIG. 1.
Figure 3:
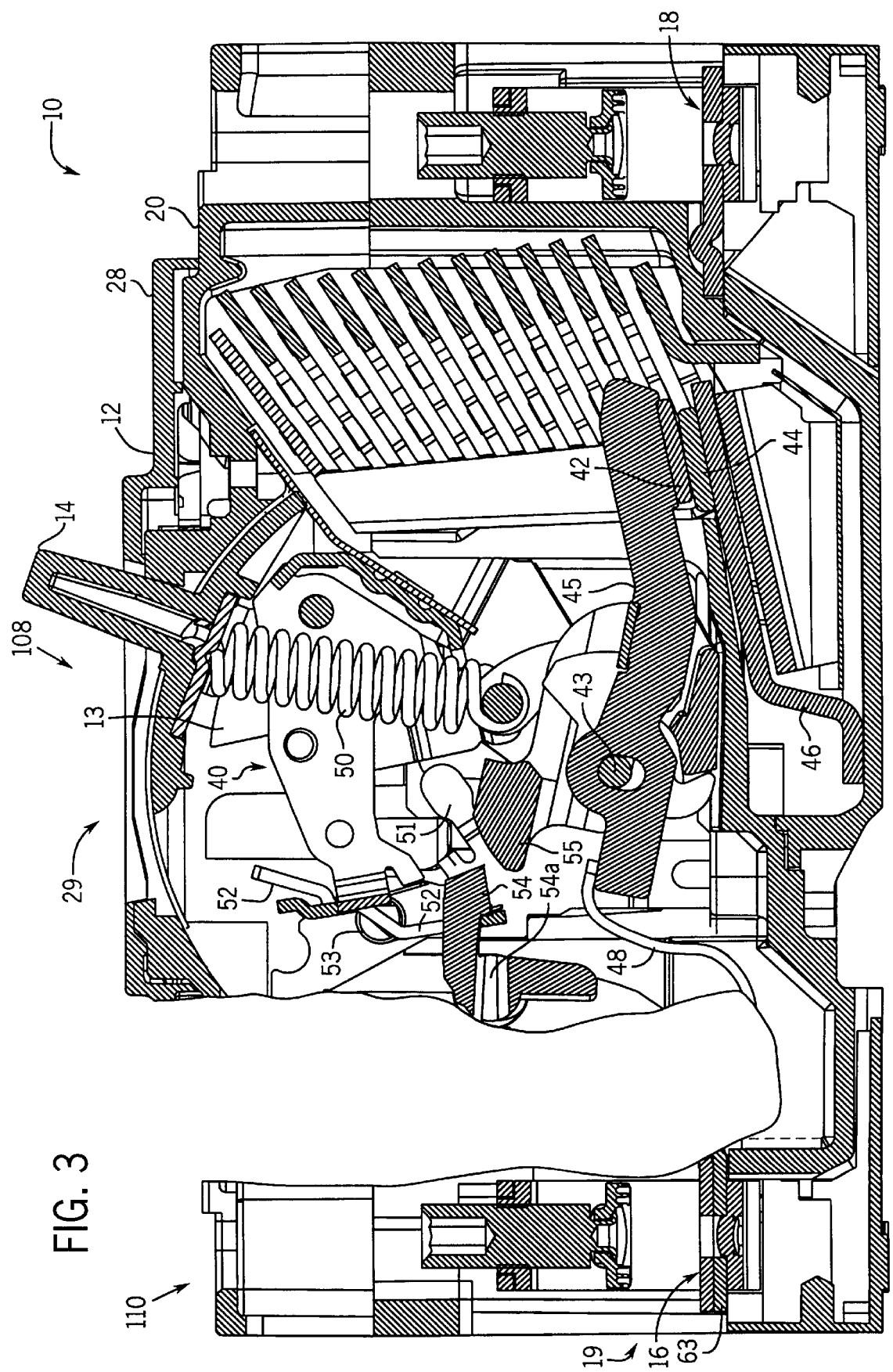
FIG. 3 is a cross-sectional view of the circuit breaker shown in FIG. 2 along the lines 3—3.

In FIGS. 2–3, one embodiment of circuit breaker 10 of system 100 is shown. Circuit breaker 10 is preferably a three phase or pole molded case circuit breaker having three sets of contacts for interrupting current in each of the three respective electrical transmission phases in the case of an overcurrent. Circuit breaker 10 includes an operating mechanism 40 which controls the switching of all three poles of the breaker. Alternatively, it is contemplated that circuit breaker 10 may be a single phase circuit breaker or other multi-phase circuit breaker.

Referring to FIG. 2, circuit breaker 10 includes a circuit breaker housing 12, an operating handle 14, load terminals 16, line terminals 18, a circuit breaker cover 20, and an opening 29. Opening 29 is provided on the top of cover 20 and configured to receive handle 14 therethrough such that handle 14 is moveable between an ON position, an OFF position, and a TRIPPED position. Cover 20 is integrally disposed over housing 12 and both are configured such that load and line connections can be accepted by load and line terminals 16, 18, respectively, disposed on opposite sides of circuit breaker 10. Cover 20 and housing 12 are preferably molded from an insulating material. Display unit 112 (not shown) would be visible from the top of cover 20 to provide information or data about circuit breaker 10.

Figure 4:
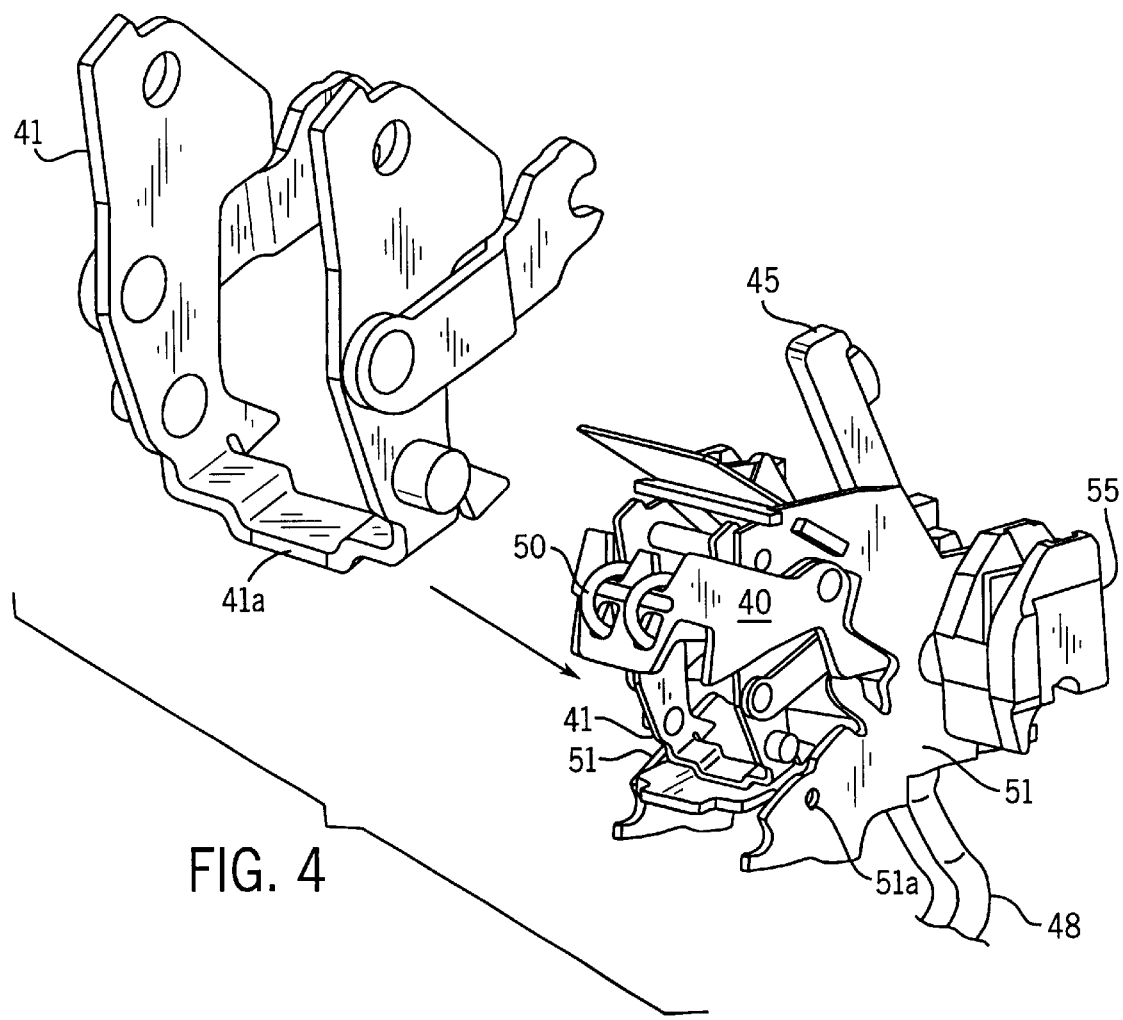
FIG. 4 is an exploded isometric drawing of an operating mechanism which comprises a portion of the circuit breaker shown in FIG. 2.

Referring to FIGS. 3–4, there is shown respectively, a cross-sectional view of circuit breaker 10, viewed along lines 3—3 as shown in FIG. 2, and an exploded isometric view of a portion of circuit breaker 10. Circuit breaker 10 includes an operating mechanism 40, operating mechanism 40 including a pivoting member 13 with the operating handle 14. Manual operation of circuit breaker 10 is accomplished by pivoting member 13 and handle 14 operable between the ON and OFF positions, within opening 29, to enable a contact operating mechanism 40 to engage and disengage a moveable contact 42 and a stationary contact 44 for each of the three phases, such that line terminal 18 and load terminal 16 of each phase can be electrically connected. Circuit breaker 10 further includes a fixed line contact arm 46 and a moveable load contact arm 45 for each of the three phases. Alternatively, circuit breaker 10 may have a moveable line contact arm to facilitate faster current interruption operation.

The moveable load contact arm 45 for each of the three phases are mechanically coupled together by an insulating cross bar member 55. The insulating cross bar member 55 is mechanically coupled to operating mechanism 40 so that, by moving handle 14 from left to right, cross bar 55 rotates in a clockwise direction and all three load contact arms 45 concurrently move to engage their corresponding line contact arms 46, thereby causing electrical contact between a moveable contact pad 42 and a stationary contact pad 44.

The operating mechanism 40 includes a cradle 41 (see FIG. 4) which engages an intermediate latch 52 to hold the contacts of circuit breaker 10 in a closed position unless and until an overcurrent condition occurs, in which case circuit breaker 10 is tripped. Intermediate latch 52 is preferably "Z" shaped, comprising an upper leg which includes a latch surface that engages cradle 41 and a lower leg which includes a latch surface that engages a trip bar 54. The center portion of intermediate latch 52 is angled with respect to the upper and lower legs and includes two tabs, which provide a pivot edge for insertion into a mechanical frame 51 (see FIG. 4). As shown in FIG. 3, intermediate latch 52 is coupled to a torsion spring 53, torsion spring 53 retained in mechanical frame 51 by the mounting tabs of intermediate latch 52. Torsion spring 53 biases the upper latch surface of intermediate latch 52 toward cradle 41 and at the same time biases trip bar 54 into a position which engages the lower latch surface of intermediate latch 52. Trip bar 54 pivots in a counter clockwise direction about an axis 54a, responsive to a current applied to an electromechanical interface unit in trip unit 110 (to be described in greater detail hereinafter), during an overcurrent condition. As trip bar 54 rotates in a counter clockwise direction, the latch surface on the upper portion of trip bar 54 disengages the latch surface on the lower portion of intermediate latch 52. When this disengagement occurs, intermediate latch 52 rotates in a counter clockwise direction due to the force of cradle 41 via operating mechanism 40. Preferably this force is provided by a tension spring 50. Tension is applied to tension spring 50 by moving handle 14 from the open position to the closed position. Alternatively, more than one tension spring 50 may be utilized.

As intermediate latch 52 rotates responsive to the upward force exerted by cradle 41, it releases the latch on operating mechanism 40, permitting cradle 41 to rotate in a clockwise direction. As cradle 41 is rotated, operating mechanism 40 is released and cross bar 55 rotates in a counter clockwise direction to move load contact arms 45 away from line contact arms 46.

During normal operation, current flows from line terminal 18 through line contact arm 46 and its stationary contact pad 44 to load contact arm 45 through its contact pad 42. Continuing through load contact arm 45, the current flows through a flexible braid 48 (or alternatively, an other connecting element between load contact arm 45 and trip unit 110) to a trip circuitry (not shown in FIG. 3) in trip unit 110 to load terminal 16. In this manner, when the current through circuit breaker 10 exceeds the rated current for circuit breaker 10, i.e., experiences an overcurrent condition, circuit breaker 10 can be tripped, i.e., opened, either manually from switch unit 108, via handle 14, or automatically from trip unit 110 via the electromechanical interface unit.

Figure 5:
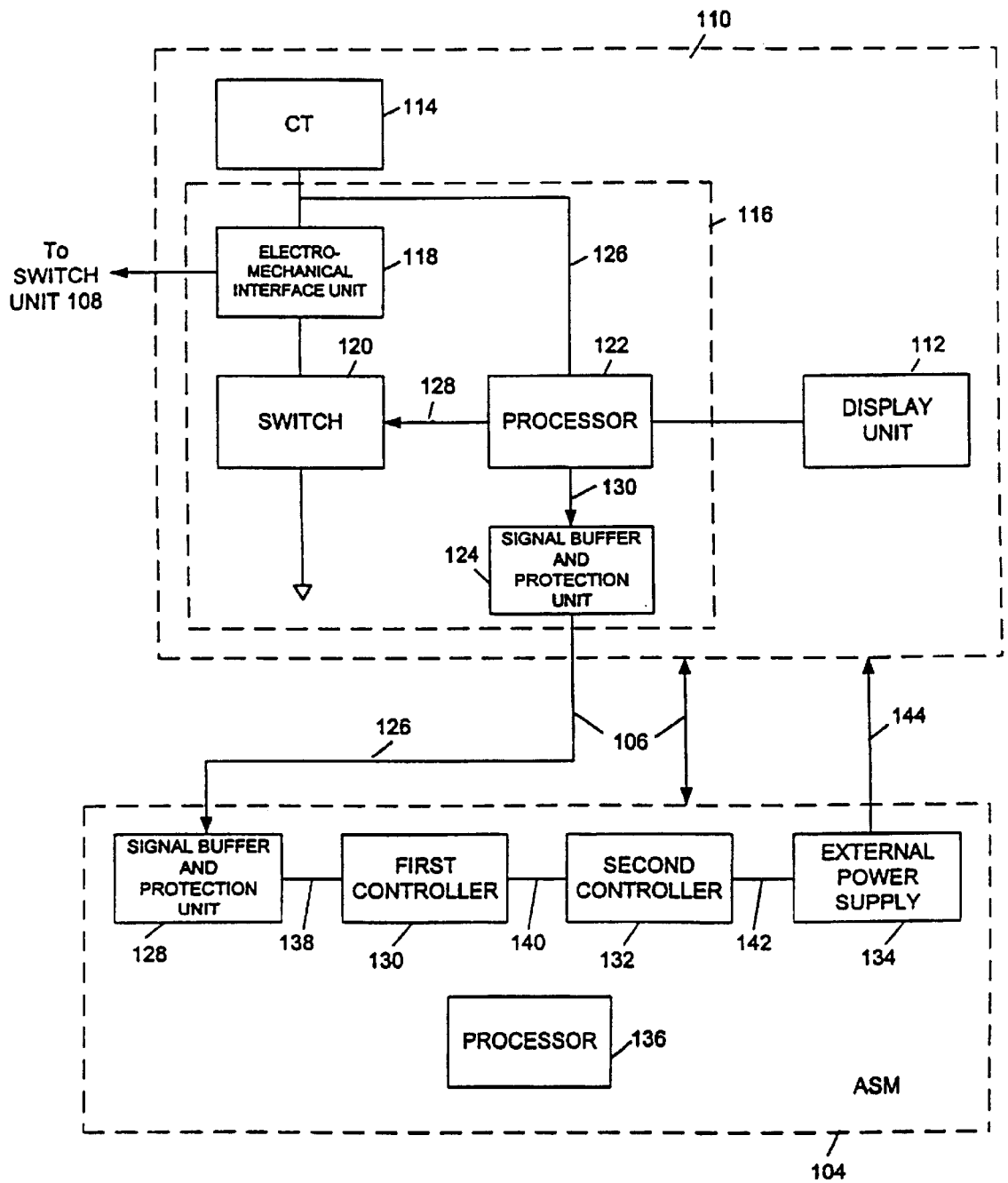
FIG. 5 is a block diagram showing a trip unit, a communication link, and an application specific module (ASM) which comprises a portion of the circuit breaker system of FIG. 1.

Referring to FIG. 5, there is shown a block diagram of an instantaneous electrical overprotection scheme and trip indication system. Trip unit 110 is located to the left of trip bar 54 shown in FIG. 3. Although not shown, trip unit 110 is modular and separable from switch unit 108. Trip unit 110 includes a current transformer (CT) 114 for each phase, a trip circuitry 116, the load terminal 16 for each phase, and the display unit 112.

Current transformer 114 for each phase relays an electrical condition in each of the respective poles, such as a current flowing between line terminal 18 and load terminal 16, and generates a sensed phase current signal corresponding to that electrical condition. The sensed phase current signals from all the phases are processed (not shown) such that they are combined into a single input signal 126 for trip circuitry 116. The input signal 126 is combined such that information relating to each phase is preserved. For example, the input signal 126 may include full-wave rectifying the sensed phase current signals.

Current transformer 114 for each phase is coupled to the trip circuitry 116. Trip circuitry 116 includes an electromechanical interface unit 118, a switch 120, a processor 122, and a signal buffer and protection unit 124. Current transformer 114 for each phase is coupled to the electromechanical interface unit 118 and to processor 122. Electromechanical interface unit 118 is coupled to switch 120, and switch 120 is coupled to processor 122. Processor 122 is also coupled to signal buffer and protection unit 124.

When processor 122 determines that the input signal 126 from current transformer 114 is representative of an overcurrent condition in any one of the phases, such as an overload, a short circuit, or a ground fault, processor 122 transmits a trip signal 128 to switch 120. Processor 122 also transmits an indication signal 130 to ASM 104.

When trip signal 128 is received by switch 120, switch 120 is configured to switch to a "close" position such that current will conduct through electromechanical interface-unit 118. Switch 120 is preferably a silicon control rectifier (SCR) and trip signal 128 is received by a gate of the SCR. In turn, electromechanical interface unit 118 is configured to actuate operating mechanism 40 in switch unit 108 to disengage the load contact arms 45 from the line contact arms 46, thereby opening the circuit. More preferably, electromechanical interface unit 118 is configured to actuate the intermediate latch 52 in switch unit 108. Electromechanical interface unit 118 acts similar to a solenoid and extends a plunger to cause the trip. Preferably electromechanical interface unit 118 includes a magnetic latch (also referred to as a maglatch).

Indication signal 130 from processor 122 is received by the signal buffer and protection unit 124. Signal buffer and protection unit 124 is configured to provide signal buffering to indication signal 130 and to protect processor 122 from electro-static discharge (ESD). Preferably unit 124 is a Schmitt-trigger inverter. Alternatively, unit 124 may be a tranzorb or a zener diode, in which case instead of connecting unit 124 in series with processor 122, unit 124 would be connected to an electrical ground. Moreover, it is contemplated that the connection between trip unit 110 and ASM 104 to transmit indication signal 130 may be a pin connection such that ASM 104 may be separable from trip unit 110.

A buffered indication signal 126 is outputted from unit 124 and transmitted to ASM 104 via communication link 106. Communication link 106 can be one of a variety of communication interfaces, such as a coaxial cable, a fiber optic cable and a wireless transmission scheme, and is configured to provide a plurality of signal transmission pathways between trip unit 110 and ASM 104. Moreover, communication link 106 may be coupled to trip unit 110 and/or ASM 104 in a modular manner such as with pin connections.

ASM 104 includes a signal buffer and protection unit 128, a first trip unit power supply controller 130, a second trip unit power supply controller 132, a trip unit external power supply 134, and a processor 136. ASM 104, among others, provides a reliable and controllable external power supply to trip unit 110 at all times, including after a trip condition has occurred, such that trip unit 110 will be capable of sensing an overcurrent, initiating a trip, relaying the indication signal 130 to ASM 104, and communicating a variety of information or data about the trip to ASM 104, and to reset trip unit 110. Moreover, ASM 104 is configured to receive, process, and store the variety of information or data about the trip condition and communicate such data back to trip unit 110 for display.

Trip unit external power supply 134 preferably powers trip unit 110 at all times, i.e., during normal and trip conditions, via a power connection 144. Alternatively, trip unit 110 may be powered by current transformer 114, for example, when no ASM 104 is present or when there is a malfunction with the trip unit external power supply 134 or power connection 144. Power connection 144 may be coupled to trip unit 110 by a pin connection or by a direct connection, and may comprise a part of communication link 106.

When a trip condition occurs, ASM 104 is configured to manipulate and control the power to trip unit 110 such that information regarding the trip condition can be communicated and trip unit 110 can be reset to sense the next overcurrent condition. Buffered indication signal 126 is transmitted from trip unit 110 to the signal buffer and protection unit 128 via communication link 106. Unit 128 serves a similar function to unit 124, i.e., to provide signal buffering and protect ASM 104 from ESD. Unit 128 can be a Schmitt-trigger inverter, a tranzorb, or a zener diode. It is contemplated that unit 124 and/or unit 128 may be omitted, although preferably the presence of such circuit for trip unit 110 and ASM 104 insures better signal integrity and component protection.

A transmitted indication signal 138 outputted from unit 128 triggers the first trip unit power supply controller 130. First controller 130 is configured to cause the trip unit external power supply 134 to delay the power shut off of trip unit 110 for a fixed period of time after the trip condition has occurred. This time delay provides the necessary power and sufficient time for processor 122 in trip unit 110 to communicate with processor 136 in ASM 104 via communication link 106. A variety of information or data regarding the trip condition is relayed to processor 136 such as, but not limited to: a short time trip, an overload trip, a ground fault trip, an instantaneous trip, a trip overcurrent value, the phase(s) with the overcurrent, etc.

The output of first controller 130 is a stretched pulse or a delay signal 140, which is then transmitted to the second trip unit power supply controller 132. Delay signal 140 triggers the second controller 132, which is configured to cause the trip unit external power supply 134 to momentary shutoff power to trip unit 110, via a reset signal 142, to reset trip circuitry 116 following the trip occurrence. The length of the power shutoff is such that it is long enough for components within trip circuitry 116 to discharge yet short enough that a thermal memory associated with display unit 112 is not degraded nor erased. Accordingly, reset signal 142 is received by the trip unit external power supply 134 to trigger the momentary shut down of power across power connection 144.

ASM 104, more preferably processor 136, is configured to store the trip data corresponding to a plurality of trip occurrences. For example, ASM 104 may store the trip data corresponding to up to ten consecutive trip occurrences, i.e. maintaining a trip log. ASM 104 is also capable of processing the information or data received from trip unit 110 to provide additional information about the trip condition and/or circuit breaker 10. ASM 104 may provide a trip and overcurrent data set corresponding to each trip occurrence, such as, but is not limited to: a count of the overload trips, a count of the short time trips, a count of the ground fault trips, a count of the instantaneous trips, a count of breaker under load switching operations, a count of breaker ON-OFF or OFF-ON switching operations, a sum of $I^2T$ values, and a time stamp of each trip occurrence. In this manner, display unit 112 can display at least a portion of the trip and overcurrent data set by communicating with and receiving from ASM 104. It is contemplated that display unit 112 need not be coupled to processor 122 as is shown in FIG. 5. Instead, display unit 112 may include its own circuitry to accomplish its display and communication functions.

Figure 6:
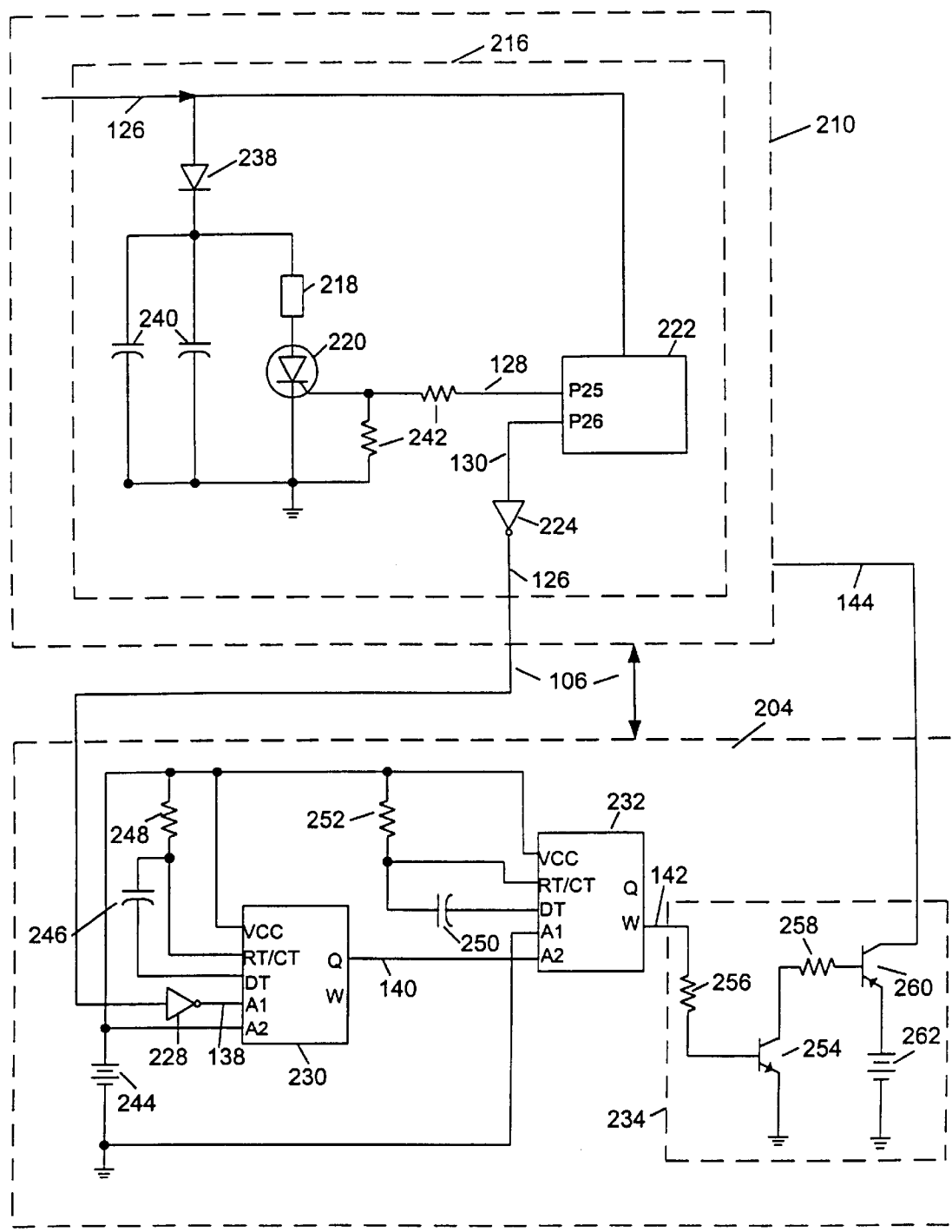
FIG. 6 is one embodiment of an electrical schematic diagram of the trip unit, the communication link, and the ASM which comprises a portion of the circuit breaker system of FIG. 1.

Referring to FIG. 6, there is shown an electrical schematic diagram of a circuit configured to provide another embodiment of the overcurrent protection and instantaneous trip indication discussed above. A trip circuitry 216 is included in a trip unit 210. Trip circuitry 216 includes an electromechanical interface unit 218, a switch 220, a processor 222, and a signal buffer and protection unit 224. When the input signal 126 from current transformer 114 is indicative of an overcurrent condition in at least one of the phases, processor 222 coupled to unit 218 initiates a trip by triggering switch 220 to a "close" position via trip signal 128. When switch 220 is its closed position, diode 238 and capacitors 240, each preferably having a value of 100 microFarads ($\mu F$), assist in conducting an appropriate amount of current through unit 218, thereby actuating intermediate latch 52. Unit 218 is preferably a maglatch, although any variety of electromechanical interfaces capable of actuating intermediate latch 52 in switch unit 108 is suitable.

Switch 220 is preferably a Motorola MCR70BA configured to switch close when a voltage of at least 0.7 volts is applied to its gate. This required voltage to the gate of the SCR is provided by trip signal 128, and resistors 242, each preferably having a value of 2.21 k$\Omega$, provide noise immunity to this gate.

Processor 222 is preferably an application specific integrated circuit (ASIC) or microcontroller. The ASIC can be an analog or digital component. As shown in FIG. 6, processor 222 is an ASIC including at least two output pins designated P25 and P26. The trip signal 128 is provided from P25 and the indication signal 130 is provided from P26. Indication signal 130 is received by the signal buffer and protection unit 224 and the buffered indication signal 126 is transmitted to an ASM 204 via communication link 106. Unit 224 is preferably a Schmitt-trigger inverter such as a Toshiba TC7W14FU.

ASM 204 includes a signal buffer and protection unit 228, a first trip unit power supply controller 230, a second trip unit power supply controller 232, and a trip unit external power supply 234. The transmitted indication signal 138 outputted from the signal buffer and protection unit 228 is received by first controller 230. Unit 228 is preferably a Schmitt-trigger inverter such as Toshiba TC7W14FU.

First controller 230 is preferably a monostable multivibrator such as a Motorola MC74HC4538A including five inputs designated VCC, RT/CT, DT, A1, and A2 and two outputs designated Q and W. The transmitted indication signal 138 is coupled to input A1, a capacitor 246 is coupled to input DT, and a resistor 248 is coupled to input RT/CT. In this embodiment, first controller 230 is configured to be a pulse stretcher, i.e., to output a pulse with a predetermined increased pulse width given an input pulse. In other words, by increasing the pulse width, a time delay can be introduced in which trip unit 210 will remain powered before trip unit 210 would be powered off in response to a trip occurrence. The pulse output width, and therefore the time delay, is determined by the values of capacitor 246 and resistor 248.

For example, values for capacitor 246 and resistor 248 of 10$\mu$F and 50k$\Omega$, respectively, result in a 500 millisecond (ms) time delay before power shutoff of trip unit 210. It is contemplated that other values of capacitor 246 and resistor 248 may be implemented as long as they provide a time delay sufficiently long enough for trip unit 210 to communicate all the desired trip data to ASM 204.

Delay signal 140 is outputted by output Q of first controller 230 to an input AZ of second controller 232. Similar to first controller 230, second controller 232 is also a monostable multivibrator including five inputs and two outputs. Second controller 232 is configured to reset trip circuitry 216 after a trip occurrence by causing toggling of the power to trip unit 210 "off" for a specified length of time, to discharge the components in trip circuitry 216, and then back "on" again, to sense the next overcurrent condition. Similarly, the power shut off time is determined by the values of capacitor 250, coupled to input DT, and resistor 252, coupled to input RT/CT. For example, values for capacitor 250 and resistor 252 of 1$\mu$F and 10 k$\Omega$, respectively, result in a 10 ms power shut off time. It is contemplated that other values of capacitor 250 and resistor 252 may be implemented as long as enough power shut off time is provided to discharge the necessary components in trip circuitry 216 while pressurizing the thermal memory in trip unit 210. As another example, power shut off time could be 2 ms.

Reset signal 142 is outputted from output W of second controller 232 and is received by the trip unit external power supply 234. Reset signal 142 is utilized to trigger the momentary power shut off of trip unit 210 via a pair of field effect transistors (FETs) 254, 260 and a pair of resistors 256, 258 included in the trip unit external power supply 234.

Unit 228, first controller 230, and second controller 232 are biased by a direct current (DC) power source 244 in ASM 204, preferably at 5 volts. Similarly, trip unit external power supply 234 is biased by a DC power source 262 in ASM 204, in the range of 5.6 to 14.8 Volts and more preferably at 9 Volts.

Figure 7:
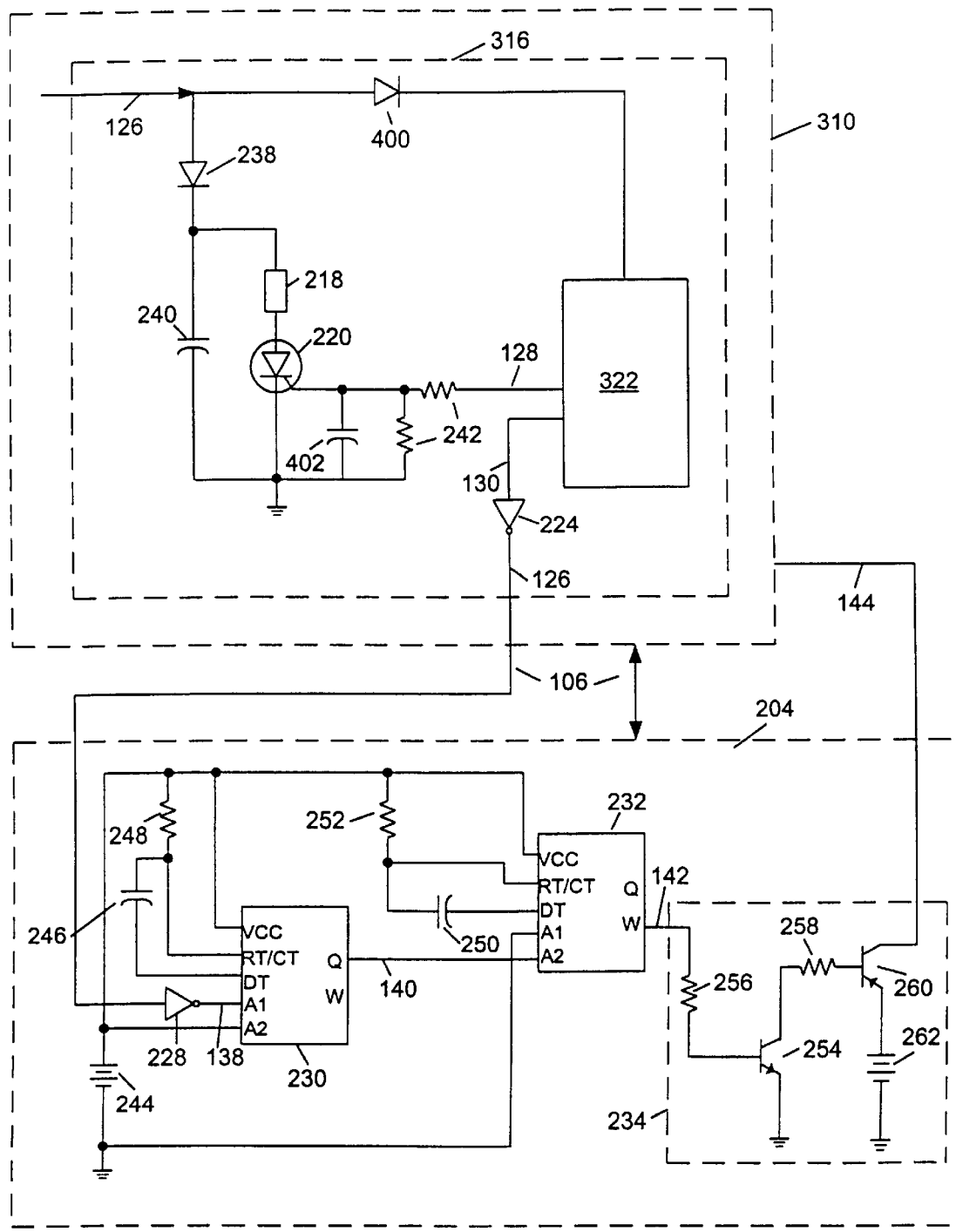
FIG. 7 is another embodiment of an electrical schematic diagram of the trip unit, the communication link, and the ASM which comprises a portion of the circuit breaker system of FIG. 1.

Referring to FIG. 7, there is shown an electrical schematic diagram of a circuit configured to provide still another embodiment of the overcurrent protection and instantaneous trip indication discussed above. A trip circuitry 316 is included in a trip unit 310. Trip circuitry 316 includes an electromechanical interface unit 218, a switch 220, a processor 322, and a signal buffer and protection unit 224.

The input signal 126 from current transformer 114 is transmitted to processor 322, via a diode 400, and is also transmitted to a diode 238. At the output of diode 238, input signal 126 can travel along two parallel circuit paths: to a capacitor 240, or the electromechanical interface unit 218 in series with the switch 220. Prior to an overcurrent condition, input signal 126 will only conduct through capacitor 240 such that capacitor 240 is charged almost instantaneously. Capacitor 240 will have no discharge path until switch 220 is in a "close" position.

When processor 322 senses an overcurrent condition in the input signal 126, processor 322 coupled to the electromechanical interface unit 218 initiates a trip by triggering switch 220 to a "close" position via trip signal 128. When switch 220 is in its closed position, the circuit path including unit 218 is allowed to conduct. Capacitor 240 and a capacitor 402 coupled to switch 220 assists in conducting an appropriate amount of actuation or release current (i.e., a low release current) through unit 218, thereby actuating unit 218. Preferably unit 218 is actuated or released with less than a 40 mA rms current. Each of capacitors 240, 402 preferably has a value of 100 microFarads (µF), Unit 218 is preferably a low impedance magnetic latch, or commonly referred to as a maglatch, having a resistance of approximately 5.5 Ω. Alternatively, any variety of low impedance electromechanical interfaces capable of actuating intermediate latch 52 in switch unit 108 is suitable.

Switch 220 is preferably a Motorola MCR70BA configured to switch close when a voltage of at least 0.7 Volts is applied to its gate. This required voltage to the gate of the SCR is provided by trip signal 128, and resistors 242, each preferably having a value of 2.21 kΩ, provide noise immunity to this gate.

Processor 322 is preferably an application specific integrated circuit (ASIC), a microcontroller, or a control circuit, having greater than 200 Ω resistance and approximately 5 Volts across it. The ASIC can be an analog or digital component. As shown in FIG. 7, processor 322 includes at least one input (i.e., input signal 126 via diode 400) and at least one output (i.e., trip signal 128).

When trip unit 310 is coupled to ASM 204, output signals such as the indication signal 130 may also be provided by processor 322. Then indication signal 130 is received by the signal buffer and protection unit 224 and the buffered indication signal 126 is transmitted to an ASM 204 via communication link 106. Furthermore, trip unit 310 may be externally powered by the trip unit power supply 234 in ASM 204. Then trip circuitry 316 can be reset to sense and provide the next overcurrent protection by trip unit power supply 234 selectively toggling power "off" then "on" again to trip circuitry 316. The period of power shutoff is long enough such that the necessary components comprising trip circuitry 316 will have sufficient time to discharge.

In this manner, dedicated components or circuitry, such as a transistor in series with diode 400, previously required to separate processor 322 from unit 218 prior to trip actuation have been eliminated. Moreover, electronic trip actuation is possible using a relatively small trip actuation or release current to the electromechanical interface unit 218.

It should be understood that the embodiments described herein are operable for circuit breakers with a range of current ratings, such as a current rating in the range of 15 to 1600 Amps. Moreover, it should be understood that the length of time that circuit breaker 10 is exposed to an overcurrent before the trip occurs depends in part on the severity of the overcurrent or alternatively, on how the trip curves have been set up. For example, a 120 Amp rated circuit breaker will trip a lot quicker for an overcurrent of 500 Amps than an overcurrent of 150 Amps.

While the embodiments and application of the invention illustrated in the FIGS. and described above are presently preferred, it should be understood that these embodiments are offered by way of example only. Other embodiments may include, for example, first and second trip unit power supply controllers 130, 132 replaced with a D-type flip-flop coupled to a microcontroller. Accordingly, the present invention is not limited to a particular embodiment, but extends to various modifications that nevertheless fall within the scope and spirit of the appended claims.

What is claimed is:

1. A system for sensing and protecting against an overcurrent condition in an electrical circuitry, comprising:
    a processor configured to sense the overcurrent condition in an input signal of the electrical circuitry;
    an electromechanical interface unit coupled to the processor and configured to initiate an opening of the electrical circuitry via a low release current, in response to a trip signal from the processor;
    a switch coupled between the processor and the electromechanical interface unit, the switch configured to receive the trip signal from the processor to permit the low release current to be transmitted to the electromechanical interface unit;
    a first capacitor coupled in parallel to the switch and the electromechanical interface unit; and
    a second capacitor coupled to the switch, wherein the first and second capacitors are configured to provide the low release current after transmission of the trip signal from the processor.

2. The system of claim 1, wherein the switch includes a silicon control rectifier (SCR) and the trip signal is received by the gate of the SCR.

3. The system of claim 1, wherein at least one of the first and second capacitors has a capacitance value of 100 µF.

4. The system of claim 1, wherein the electromechanical interface unit includes a low impedance magnetic latch.

5. The system of claim 1, wherein the electromechanical interface unit has a resistance of approximately 5.5 Ω.

6. The system of claim 1, wherein the low release current is a current of less than 40 MA rms.

7. The system of claim 1, wherein the processor is selected from a group including an application specific integrated circuit (ASIC), a microcontroller, and a control circuit.

8. The system of claim 7, wherein the processor has a resistance of greater than 200 Ω and has approximately 5 Volts across it.

9. The system of claim 1, wherein the input signal includes at least one phase of a current signal that has been full-wave rectified.

10. A method for sensing and protecting against an overcurrent condition in an electrical circuitry, comprising:
    (a) sensing the overcurrent condition with a processor; and
    (b) actuating a trip in the electrical circuitry via a low release current, in response to a trip signal from the processor, wherein actuating a trip includes transmitting the trip signal to a switch coupled to the processor, and discharging a first capacitor and a second capacitor coupled to the switch to provide the low release current.

11. The method of claim 10, wherein step (a) of sensing includes comparing an input signal from the electrical circuitry against a rated current, the input signal comprising at least one phase of a current signal that has been full-wave rectified.

12. The method of claim 10, wherein the switch includes a silicon control rectifier (SCR) and the trip signal is received by the gate of the SCR.

13. The method of claim 10, wherein step (b) of actuating includes switching the switch to a position that permits the low release current to conduct to an electromechanical interface unit coupled to the switch, in response to receiving the trip signal.

14. The method of claim 13, wherein step (b) of actuating includes causing the electromechanical interface unit to trigger a mechanical opening of the electrical circuitry, thereby causing the trip of the electrical circuitry.

15. The method of claim 14, wherein the electromechanical interface unit includes a low impedance magnetic latch.

16. The method of claim 14, wherein the electromechanical interface unit has a resistance of approximately 5.5 Ω.

17. The method of claim 10, wherein the low release current is a current of less than 40 mA rms.

18. The method of claim 10, wherein the low release current is a current of less than 40 mA.

19. A system for sensing and protecting against an overcurrent condition in an electrical circuitry, comprising:

means for sensing the overcurrent condition and communicating a trip signal in response to the overcurrent condition; and means for initiating opening of the electrical circuitry in response to the trip signal, via a low release current, the means for initiating coupled to the means for sensing, wherein the means for initiating includes a switch coupled to the means for sensing, an electromechanical interface unit coupled to the switch and the electrical circuitry, a first capacitor coupled in parallel to the switch and the electromechanical interface unit, and a second capacitor coupled to the switch, and wherein the first and second capacitors are configured to provide the low release current to the electromechanical interface unit.

20. The system of claim 19, wherein the means for sensing includes an apparatus selected from a group including an application specific integrated circuit (ASIC), a microcontroller, and a control circuit.

21. The system of claim 19, wherein the means for sensing has a resistance of greater than 200 Ω and has a load voltage of approximately 5 Volts.

22. The system of claim 19, wherein the low release current is a current of less than 40 MA rms.

23. The system of claim 19, wherein the switch includes a silicon control rectifier (SCR) and the trip signal is received by the gate of the SCR.

24. The system of claim 19, wherein at least one of the first and second capacitors has a capacitance value of 100 $\mu$F.

25. The system of claim 19, wherein the electromechanical interface unit includes a low impedance magnetic latch.

26. A trip circuitry, comprising:

a processor;

an electromechanical interface unit coupled to the processor;

a switch coupled between the processor and the electromechanical interface unit;

a first capacitor coupled to the switch; and a second capacitor coupled to the switch, wherein an overcurrent condition in an electrical circuitry sensed by the processor causes the first and second capacitors to allow for a low release current to the electromechanical interface unit to open the electrical circuitry.

27. The trip circuitry of claim 26, wherein at least one of the first and second capacitors has a capacitance of approximately 100 $\mu$F.

28. The trip circuitry of claim 26, further comprising a signal buffer and protection unit coupled to the processor.

29. The trip circuitry of claim 26, wherein the electromechanical interface unit includes a magnetic latch, and the switch includes a silicon control rectifier (SCR) configured to receive a trip signal at a gate of the SCR, the trip signal transmitted from the processor in response to the sensed overcurrent condition.

30. The trip circuitry of claim 26, wherein the low release current is a current of less than 40 mA rms.

31. The trip circuitry of claim 26, further comprising a diode coupled to at least the first or second capacitor and configured to prevent at least the first or second capacitor from discharging to a source other than the electromechanical interface unit.

32. The trip circuitry of claim 26, wherein the first capacitor is coupled in parallel to the switch.

* * * * *